US008782604B2

(12) United States Patent
Konduri et al.

(10) Patent No.: US 8,782,604 B2
(45) Date of Patent: Jul. 15, 2014

(54) SANDBOX SUPPORT FOR METADATA IN RUNNING APPLICATIONS

(75) Inventors: Gangadhar Konduri, Mountain View, CA (US); Denny McKinney, Los Altos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 954 days.

(21) Appl. No.: 12/101,420

(22) Filed: Apr. 11, 2008

(65) Prior Publication Data

US 2009/0259993 A1    Oct. 15, 2009

(51) Int. Cl.
*G06F 9/44*    (2006.01)
*G06F 11/36*    (2006.01)

(52) U.S. Cl.
CPC .................................. *G06F 11/3664* (2013.01)
USPC .......................................................... 717/122

(58) Field of Classification Search
CPC ................................................... G06F 11/3664
USPC ......................................................... 717/122
See application file for complete search history.

(56) References Cited

U.S. PATENT DOCUMENTS

| | | | |
|---|---|---|---|
| 5,790,778 A | 8/1998 | Bush et al. | |
| 5,850,518 A | 12/1998 | Northrup | |
| 6,117,180 A | 9/2000 | Dave et al. | |
| 6,138,270 A | 10/2000 | Hsu | |
| 6,397,254 B1 | 5/2002 | Northrup | |
| 6,401,134 B1 | 6/2002 | Razavi et al. | |
| 6,421,705 B1 | 7/2002 | Northrup | |
| 6,442,751 B1 | 8/2002 | Cocchi et al. | |
| 6,487,713 B1 | 11/2002 | Cohen et al. | |
| 6,546,413 B1 | 4/2003 | Northrup | |
| 6,601,233 B1 | 7/2003 | Underwood | |
| 6,671,713 B2 | 12/2003 | Northrup | |
| 6,671,746 B1 | 12/2003 | Northrup | |
| 6,779,000 B1 | 8/2004 | Northrup | |
| 6,807,636 B2 | 10/2004 | Hartman et al. | |
| 6,901,580 B2 | 5/2005 | Iwanojko et al. | |
| 6,922,675 B1 | 7/2005 | Chatterjee et al. | |
| 6,922,705 B1 | 7/2005 | Northrup | |
| 6,947,992 B1 | 9/2005 | Shachor | |

(Continued)

OTHER PUBLICATIONS

Jennifer Vesperman, "Essential CVS", Jun. 9, 2003, O'Reilly Media Inc.*

(Continued)

*Primary Examiner* — Wei Zhen
*Assistant Examiner* — Lanny Ung
(74) *Attorney, Agent, or Firm* — Kilpatrick Townsend & Stockton LLP

(57) ABSTRACT

Techniques for using a sandbox to test changes to the metadata of a metadata-driven application. In one set of embodiments, a mainline and a sandbox are created in a runtime environment of a metadata-driven application. The mainline is configured to include a mainline version of a metadata document of the application. The sandbox is configured to include a sandbox (i.e., test) version of the metadata document. At application runtime, requests to access and/or modify the metadata document are serviced either from the mainline or the sandbox based on a sandbox context of the current user session. Thus, changes to the metadata document may be tested on the sandbox version without affecting the mainline version, and vice versa. In various embodiments, multiple sandboxes may be supported in the runtime environment. In further embodiments, the sandbox version may be merged into the mainline version without bringing the runtime environment offline.

32 Claims, 5 Drawing Sheets

(56) References Cited

U.S. PATENT DOCUMENTS

| | | |
|---|---|---|
| 7,028,019 B2 | 4/2006 | McMillan et al. |
| 7,062,749 B2 | 6/2006 | Cyr et al. |
| 7,086,009 B2 | 8/2006 | Resnick et al. |
| 7,188,158 B1 | 3/2007 | Stanton et al. |
| 7,203,938 B2 | 4/2007 | Ambrose et al. |
| 7,343,360 B1 | 3/2008 | Ristanovic et al. |
| 7,349,913 B2 | 3/2008 | Clark et al. |
| 7,535,927 B1 | 5/2009 | Northrup |
| 7,536,606 B2 | 5/2009 | Andrews et al. |
| 7,584,207 B2 | 9/2009 | Mortensen et al. |
| 7,603,674 B2 | 10/2009 | Cyr et al. |
| 7,644,262 B1 | 1/2010 | Bromley et al. |
| 7,693,851 B2 | 4/2010 | Becker |
| 7,721,158 B2 | 5/2010 | Lee |
| 7,774,477 B2 | 8/2010 | Zintel et al. |
| 7,783,782 B2 | 8/2010 | Cromp et al. |
| 7,788,338 B2 | 8/2010 | Savchenko et al. |
| 7,793,340 B2 | 9/2010 | Kiester et al. |
| 7,827,494 B1 | 11/2010 | Hedayatpour et al. |
| 7,840,941 B2 | 11/2010 | Brookins et al. |
| 7,853,899 B1 | 12/2010 | Damaschke et al. |
| 7,865,544 B2 | 1/2011 | Kordun et al. |
| 7,895,512 B2 | 2/2011 | Roberts |
| 7,933,946 B2 | 4/2011 | Livshits et al. |
| 7,945,907 B2 | 5/2011 | Dreiling et al. |
| 7,950,424 B2 | 5/2011 | Ozanne et al. |
| 7,984,424 B2 | 7/2011 | Dengler et al. |
| 8,015,545 B2 | 9/2011 | Seto et al. |
| 8,074,214 B2 | 12/2011 | Isaacson et al. |
| 8,108,825 B2 | 1/2012 | Goodwin et al. |
| 8,209,675 B2 | 6/2012 | Zhao et al. |
| 8,271,609 B2 | 9/2012 | Addala et al. |
| 8,332,654 B2 | 12/2012 | Anbuselvan |
| 8,538,998 B2 | 9/2013 | Barrow |
| 8,560,938 B2 | 10/2013 | Barrow et al. |
| 2002/0023140 A1 | 2/2002 | Hile et al. |
| 2002/0103660 A1 | 8/2002 | Cramon et al. |
| 2002/0129060 A1 | 9/2002 | Rollins et al. |
| 2002/0143735 A1 | 10/2002 | Ayi et al. |
| 2002/0147757 A1 | 10/2002 | Day et al. |
| 2002/0188613 A1 | 12/2002 | Chakraborty et al. |
| 2003/0005117 A1 | 1/2003 | Kang et al. |
| 2003/0025732 A1 | 2/2003 | Prichard |
| 2003/0033310 A1 | 2/2003 | Factor et al. |
| 2003/0034989 A1 | 2/2003 | Kondo |
| 2003/0084424 A1 | 5/2003 | Reddy et al. |
| 2003/0088857 A1 | 5/2003 | Salva et al. |
| 2003/0172127 A1 | 9/2003 | Northrup |
| 2003/0172168 A1* | 9/2003 | Mak et al. ............... 709/230 |
| 2003/0172193 A1 | 9/2003 | Olsen |
| 2003/0192031 A1 | 10/2003 | Srinivasan et al. |
| 2003/0204518 A1* | 10/2003 | Lang et al. ............... 707/101 |
| 2003/0204645 A1 | 10/2003 | Sharma et al. |
| 2003/0233631 A1 | 12/2003 | Curry et al. |
| 2003/0233642 A1 | 12/2003 | Hank |
| 2004/0046787 A1 | 3/2004 | Henry et al. |
| 2004/0046789 A1 | 3/2004 | Inanoria |
| 2004/0054991 A1 | 3/2004 | Harres |
| 2004/0073565 A1 | 4/2004 | Kaufman et al. |
| 2004/0078424 A1 | 4/2004 | Yairi et al. |
| 2004/0111533 A1 | 6/2004 | Beisiegel et al. |
| 2004/0111673 A1 | 6/2004 | Bowman et al. |
| 2004/0148588 A1 | 7/2004 | Sadiq |
| 2004/0181534 A1 | 9/2004 | Mortensen et al. |
| 2004/0194016 A1 | 9/2004 | Liggitt |
| 2004/0205117 A1 | 10/2004 | Hertling et al. |
| 2004/0205765 A1 | 10/2004 | Beringer et al. |
| 2004/0230639 A1 | 11/2004 | Soluk et al. |
| 2005/0044197 A1 | 2/2005 | Lai |
| 2005/0183074 A1 | 8/2005 | Alexander et al. |
| 2005/0193061 A1 | 9/2005 | Schmidt et al. |
| 2005/0223361 A1 | 10/2005 | Belbute |
| 2005/0251788 A1 | 11/2005 | Henke et al. |
| 2005/0273772 A1 | 12/2005 | Matsakis et al. |
| 2006/0010163 A1 | 1/2006 | Herzog et al. |
| 2006/0015847 A1 | 1/2006 | Carroll, Jr. |
| 2006/0031750 A1 | 2/2006 | Waldorf et al. |
| 2006/0036463 A1 | 2/2006 | Patrick et al. |
| 2006/0075387 A1 | 4/2006 | Martin et al. |
| 2006/0080117 A1 | 4/2006 | Carr et al. |
| 2006/0101038 A1 | 5/2006 | Gabriel et al. |
| 2006/0106626 A1 | 5/2006 | Jeng et al. |
| 2006/0130047 A1 | 6/2006 | Burugapalli |
| 2006/0136832 A1 | 6/2006 | Keller et al. |
| 2006/0143229 A1 | 6/2006 | Bou-Ghannam et al. |
| 2006/0150156 A1 | 7/2006 | Cyr et al. |
| 2006/0165105 A1 | 7/2006 | Shenfield et al. |
| 2006/0168132 A1 | 7/2006 | Bunter et al. |
| 2006/0168355 A1 | 7/2006 | Shenfield et al. |
| 2006/0168557 A1 | 7/2006 | Agrawal et al. |
| 2006/0184866 A1 | 8/2006 | Rees |
| 2006/0206858 A1 | 9/2006 | Becker et al. |
| 2006/0235733 A1 | 10/2006 | Marks |
| 2006/0235986 A1 | 10/2006 | Kim |
| 2006/0242636 A1 | 10/2006 | Chilimbi et al. |
| 2006/0253490 A1 | 11/2006 | Krishna et al. |
| 2006/0265702 A1 | 11/2006 | Isaacson et al. |
| 2006/0271537 A1 | 11/2006 | Chandrasekharan et al. |
| 2006/0277542 A1 | 12/2006 | Wipfel |
| 2006/0294474 A1 | 12/2006 | Taylor et al. |
| 2006/0294506 A1 | 12/2006 | Dengler et al. |
| 2007/0016429 A1 | 1/2007 | Bournas et al. |
| 2007/0055936 A1 | 3/2007 | Dhanjal et al. |
| 2007/0106975 A1 | 5/2007 | Deline |
| 2007/0113191 A1 | 5/2007 | Keller et al. |
| 2007/0130205 A1 | 6/2007 | Dengler et al. |
| 2007/0157078 A1 | 7/2007 | Anderson |
| 2007/0169199 A1 | 7/2007 | Quinnell et al. |
| 2007/0174763 A1 | 7/2007 | Chang et al. |
| 2007/0174822 A1 | 7/2007 | Moser et al. |
| 2007/0203956 A1 | 8/2007 | Anderson et al. |
| 2007/0220429 A1 | 9/2007 | Kureshy et al. |
| 2007/0240096 A1 | 10/2007 | Pontoppidan et al. |
| 2007/0245340 A1 | 10/2007 | Cohen et al. |
| 2007/0271552 A1 | 11/2007 | Pulley |
| 2007/0277095 A1 | 11/2007 | Ukigawa |
| 2007/0282885 A1 | 12/2007 | Baude et al. |
| 2007/0294586 A1 | 12/2007 | Parvathy et al. |
| 2007/0294664 A1 | 12/2007 | Joshi |
| 2008/0004887 A1 | 1/2008 | Brunswig et al. |
| 2008/0028302 A1 | 1/2008 | Meschkat |
| 2008/0065675 A1 | 3/2008 | Bozich et al. |
| 2008/0077848 A1 | 3/2008 | Roberts |
| 2008/0083012 A1 | 4/2008 | Yu et al. |
| 2008/0104617 A1 | 5/2008 | Apacible et al. |
| 2008/0120557 A1 | 5/2008 | Offenhartz et al. |
| 2008/0126396 A1 | 5/2008 | Gagnon |
| 2008/0127087 A1 | 5/2008 | Brookins et al. |
| 2008/0127124 A1 | 5/2008 | Gilfix et al. |
| 2008/0162304 A1 | 7/2008 | Ourega |
| 2008/0163164 A1 | 7/2008 | Chowdhary et al. |
| 2008/0183479 A1 | 7/2008 | Iwashita et al. |
| 2008/0183744 A1 | 7/2008 | Adendorff et al. |
| 2008/0184201 A1 | 7/2008 | Burns et al. |
| 2008/0189358 A1 | 8/2008 | Charles |
| 2008/0189617 A1 | 8/2008 | Covell et al. |
| 2008/0196024 A1 | 8/2008 | Barfield et al. |
| 2008/0243901 A1 | 10/2008 | Super et al. |
| 2008/0250313 A1 | 10/2008 | Kamdar et al. |
| 2008/0275844 A1 | 11/2008 | Buzsaki et al. |
| 2008/0276218 A1 | 11/2008 | Taylor et al. |
| 2008/0276260 A1 | 11/2008 | Garlick et al. |
| 2008/0295109 A1 | 11/2008 | Huang et al. |
| 2008/0313648 A1 | 12/2008 | Wang et al. |
| 2009/0031280 A1 | 1/2009 | Koehler |
| 2009/0083297 A1 | 3/2009 | Pohl et al. |
| 2009/0106494 A1 | 4/2009 | Knebel |
| 2009/0144716 A1 | 6/2009 | Felts |
| 2009/0144729 A1 | 6/2009 | Guizar |
| 2009/0150565 A1 | 6/2009 | Grossner et al. |
| 2009/0157859 A1 | 6/2009 | Morris |
| 2009/0158237 A1 | 6/2009 | Zhang et al. |
| 2009/0178020 A1 | 7/2009 | Goodwin et al. |
| 2009/0204567 A1 | 8/2009 | Barrow |

(56) References Cited

U.S. PATENT DOCUMENTS

| | | | |
|---|---|---|---|
| 2009/0204629 A1 | 8/2009 | Barrow |
| 2009/0204884 A1 | 8/2009 | Barrow et al. |
| 2009/0204943 A1 | 8/2009 | Konduri |
| 2009/0205013 A1 | 8/2009 | Lowes |
| 2009/0217153 A1 | 8/2009 | Oshima et al. |
| 2009/0292797 A1 | 11/2009 | Cromp et al. |
| 2009/0313256 A1 | 12/2009 | Konduri et al. |
| 2010/0057482 A1 | 3/2010 | Radhakrishnan et al. |
| 2010/0057836 A1 | 3/2010 | Anbuselvan |
| 2010/0070553 A1 | 3/2010 | Addala et al. |
| 2010/0070973 A1 | 3/2010 | Addala et al. |
| 2010/0082556 A1 | 4/2010 | Srinivasan et al. |
| 2010/0132009 A1 | 5/2010 | Khemani et al. |
| 2010/0146291 A1 | 6/2010 | Anbuselvan |
| 2010/0236660 A1 | 9/2010 | Ozanne et al. |
| 2010/0313038 A1 | 12/2010 | Bradley |
| 2011/0023071 A1 | 1/2011 | Li et al. |
| 2011/0119649 A1 | 5/2011 | Kand et al. |
| 2011/0119651 A1 | 5/2011 | Utschig-Utschig et al. |
| 2013/0086568 A1 | 4/2013 | Krishnamurthy |

OTHER PUBLICATIONS

U.S. Appl. No. 12/790,437, filed May 28, 2010, Utschig-Utschig et al.

U.S. Appl. No. 12/791,445, filed May 28, 2010, Kand et al.

Beisiegel, et al., "SCA Service Component Architecture—Assembly Model Specification," Mar. 15, 2007, SCA version 1.00, 91 pages, BEA Systems, Inc.

"Business Process Language (BPEL) and Oracle BPEL Process Manager," Oracle FAQ, updated Jun. 26, 2004, printed on Nov. 11, 2009, at URL: http://www.oracle.com/technology/products/ias/bpel/htdocs/orabpel_faq.html?_template=. . ., 3 pages.

Chapman, et al., "SCA Service Component Architecture—Client and Implementation Model Specification for WS-BPEL," Mar. 21, 2007, SCA version 1.00, 15 pages, BEA Systems, Inc.

Chappell, "Introducing SCA," David Chappell & Associates, Jul. 2007, pp. 1-22.

CipherSoft Inc, "Exodus-Main Features Benefits" Products, at URL: http://www.ciphersoftinc.com/products/expdus-features-benefits.html; printed on Aug. 28, 2009; 3 pages.

CipherSoft Inc, "Exodus™ Products," printed on Aug. 28, 2009, at URL: http://www.ciphersoftinc.com/products/migration-products-overview.html; 3 pages.

"Client-Server Modernization—From Oracle® Forms to Java," VGO Software Products, printed on Aug. 28, 2009, at URL: http://www.vgosoftware.com/products/evo/index.php; 2 pages.

Dynamic Structure in ADF UIX Pages, from Oracle ADF UIX Developer's Guide, pp. 1-11 downloaded from http://www.oracle.com/webapps/online-help/jdeveloper/10.1.2/state/content/navId.4/navSetId._/vtAnchor.DeltaTree/vtTopicFile.uixhelp%7Cuixdevguide%7Cdynamic%7Ehtml/ on Apr. 21, 2008.

"Oracle Forms to Java Modernization" printed on Aug. 28, 2009, at URL: http://www.vgosoftware.com/products/evo/walkthrough.php; VGO Software Information printed 5 pages.

Sheperd, et al., "Oracle SCA—The Power of the Composite," An Oracle White Paper, Aug. 2009, pp. 1-19, Oracle.

"Vgo Software First to Convert Oracle Forms to Oracle ADF V11"; VGO News, printed on Aug. 28, 2009; at URL: http://www.vgosoftware.com/about/news/view_article.php?new_id=35; 2 pages.

Smith, Portals: Toward an Application Framework for Interoperability,: Communications of the ACM, Oct. 2004, vol. 47, No. 10, pp. 93-97.

Phanouriou, "UIML: A Device-Independent User Interface Markup Language," Doctoral Dissertation, Virginia Polytechnic Institute and State University, Sep. 26, 2000, 172 pages.

"File and Registry Virtualization—the good, the bad, and the ugly," Jerry's Incoherent Babbling; Windows Connected Blog; Published Dec. 19, 2005; at URL: http://windowsconnected.com/blogs/jerry/archive/2005/12/19/file-and-registry-virtualization-the-good-the-bad-and-t . . .; 6 pages.

Zhang, et al., "Schema Based XML Security: RBAC Approach," Machine Simulator, Third International Conference on Computer Assisted Learning, Published 2003, at URL: http://citeseerx.ist.psu.edu/viewdoc/summary?doi=10.1.1.3.6016, pp. 1-15.

Hildebrandt, G., "Web-based Document Management", Apr. 2001, 22 pages.

Shang-Pin Ma, "Discovery-Based Service Composition, "National Central University, Doctoral Dissertation. Jan. 2007, 109 pages.

Yang et al., "Web Component: A Substrate for Web Service Reuse and Composition". Proc. 14th Conf. Advanced Information Systems Eng. (CAiSE 02), LNCS 2348, Springer-Verlag, 2002, 16 pages.

Non-Final Office Action for U.S. Appl. No. 12/029,605, mailed on Jul. 20, 2011, 12 pages.

Final Office Action for U.S. Appl. No. 12/029,600, mailed on Oct. 19, 2011, 20 pages.

Final Office Action for U.S. Appl. No. 12/029,605, mailed on Nov. 2, 2011, 13 pages.

Final Office Action for U.S. Appl. No. 12/029,609, mailed on Nov. 8, 2011, 13 pages.

Final Office Action for U.S. Appl. No. 12/138,997, mailed on Dec. 5, 2011, 13 pages.

Non-Final Office Action for U.S. Appl. No. 12/487,004, mailed on Sep. 28, 2011, 29 pages.

Final Office Action for U.S. Appl. No. 12/029,615 mailed on Jul. 31, 2012, 33 pages.

Notice of Allowance for U.S. Appl. No. 12/330,008 mailed on Aug. 7, 2012, 17 pages.

Notice of Allowance for U.S. Appl. No. 12/210,657 mailed on Jun. 26, 2012, 6 pages.

Notice of Allowance for U.S. Appl. No. 12/330,008 mailed on Jun. 11, 2012, 7 pages.

U.S. Appl. No. 13/360,127 filed by Krishamurthy et al. on Jan. 27, 2012.

"AJAX & Security: Vulnerability in DWR Security Logic Identified Can Potentially be exploited to launce DoS attacks and break into back-end servers", published Jan. 8, 2007, AjaxWorld™ Magazine, pp. 1-4 downloaded on Oct. 6, 2008 from http://ajax.sys-con.com/node/319868, 4 pages.

"Direct Web Remoting, About DWR's Javascript Security", 4 pages downloaded from http://directwebremoting.org/dwr/security/script-tag-protection on Oct. 6, 2008.

"Direct Web Remoting, DWR version 2—New and Noteworthy", 4 pages downloaded from http://directwebremoting.org/dwr/changelog/dwr20 on Dec. 5, 2008.

"Direct Web Remoting, DWR: Easy AJAX for JAVA", 2 pages downloaded from http://directwebremoting.org/dwr/overview/dwr on Oct. 6, 2008.

"Direct Web Remoting, Safari, GET and Request Forgery", 1 page downloaded from http://directwebremoting.org/dwr/security/allowGetForSafariButMakeForgeryEasier on Oct. 6, 2008.

"Direct Web Remoting, Security", 4 pages downloaded from http://directwebremoting.org/dwr/security on Oct. 6, 2008.

"Google Web Toolkit, Product Overview", 3 pages downloaded from http://code.google.com/webtoolkit/overview.html on Oct. 6, 2008.

"Oracle Application Framework", Oracle, Dec. 2006, pp. 1-242, 242 pages.

Altenhofen et al., "ASMs in Service Oriented Architectures", Journal of Universal Computer Science, vol. 14, No. 12, 2008, 25 pages.

Box et al., "Web Services Addressing (WS-Addressing)" Aug. 10, 2004, 23 pages, http://www.w3.org/Submission/ws-addressing/#_Toc77464317, printed on Aug. 18, 2009, 23 pages.

Carey, "Making BPEL Processes Dynamic" Oracle Technology Network, 8 pages, printed on Aug. 18, 2009, 8 pages.

Claypool et al., "Optimizing Performance of Schema Evolution Sequences", Objects and Databases [online], 2000 [retrieved Feb. 7, 2012], retrieved from Internet: http://se-pubs.dbs.uni-leipzig.de/files/Claypool2000OptimizingPerformanceofSchemaEvolutionSequences.pdf, pp.114-127, 14 pages.

(56) References Cited

OTHER PUBLICATIONS

Curphey et al., "Web Application Security Assessment Tools", IEEE, 2006, pp. 32-41, 10 pages.
Dipaola et al., "Subverting Ajax", Dec. 2006, 23rd CCC Conference, pp. 1-8, 8 pages.
Hohpe et al., "Messaging Systems" Enterprise Integration Patterns 2004, pp. 57-97, Chapter 3, Pearson Education, Inc, Boston, Massachusetts, 45 pages.
Nagappan et al., "XML Processing and Data Binding with Java APIs" in: Developing Java Web Services: Architecting and Developing Secure Web Services Using Java [online], 2003 [retrieved Feb. 7, 2012], retrieved from Internet: http://java.sun.com/developer/Books/j2ee/devjws/, pp. 313-399, 89 pages.
Steinberg, "Data Binding with JAXB" [online], 2003 [retrieved Feb. 7, 2012], retrieved from Internet: https://www6.software.ibm.com/developerworks/education/x-jabx/x-jaxb-a4.pdf, pp. 1-34, 34 pages.
Non-Final Office Action for U.S. Appl. No. 12/210,657 mailed on Apr. 25, 2011, 21 pages.
Non-Final Office Action for U.S. Appl. No. 12/210,657 mailed on Sep. 30, 2011, 21 pages.
Non-Final Office Action for U.S. Appl. No. 12/212,599 mailed on Dec. 22, 2011, 10 pages.
Non-Final Office Action for U.S. Appl. No. 12/330,008 mailed on Dec. 21, 2011, 14 pages.
Non-Final Office Action for U.S. Appl. No. 12/029,615 mailed on Feb. 15, 2012, 27 pages.
Final Office Action for U.S. Appl. No. 12/487,004 mailed on Mar. 19, 2012, 30 pages.
Final Office Action for U.S. Appl. No. 12/210,657 mailed on Apr. 3, 2012, 23 pages.
Final Office Action for U.S. Appl. No. 12/330,008 mailed on Apr. 10, 2012, 13 pages.
Mietzner, et al., "Defining Composite Configurable SaaS Application Packages Using SCA Variability Descriptors and Multi-Tenancy Patters,", 2008, pp. 156-161.
Phillips, Josh. Window's Connected UseriD: Jerry. Jerry's Incoherent Babbling: "File and Registry Virtualization- the good, the bad, and the ugly". <http://wi ndowsco n nected. co m/b logs/jerry/archive/2005/ 12/1 9/fi l e-and-reg istry-vi rtual izatio n-th e-good-th ebad- and-the-ugly.aspx>. Published: Dec. 19, 2005.
Non-Final Office Action for U.S. Appl. No. 12/203,816 mailed on Sep. 2, 2010, 30 pages.
Non-Final Office Action for U.S. Appl. No. 12/203,816 mailed on Oct. 26, 2012 30 pages.
Non-Final Office Action for U.S. Appl. No. 12/029,724 mailed on Jan. 7, 2013, 39 pages.
Final Office Action for U.S. Appl. No. 12/029,724 mailed on Apr. 30, 2013, 33 pages.
Terminal Disclaimer—Approved for U.S. Appl. No. 12/029,600 mailed on Oct. 25, 2011, 1 page.
Non-Final Office Action for U.S. Appl. No. 12/029,600 mailed on Sep. 17, 2012, 38 page.
Notice of Allowance for U.S. Appl. No. 12/029,600 mailed on Nov. 7, 2012, 16 pages.
Notice of Allowance for U.S. Appl. No. 12/029,600 mailed on Feb. 5, 2013, 16 pages.
Non-Final Office Action for U.S. Appl. No. 12/029,605 mailed on Apr. 10, 2013, 38 pages.
Non-Final Office Action for U.S. Appl. No. 12/029,609 mailed on Jul. 28, 2011, 29 pages.
Notice of Allowance for U.S. Appl. No. 12/029,609 mailed on Feb. 4, 2013, 52 pages.
Non-Final Office Action for U.S. Appl. No. 12/212,599 mailed on Aug. 2, 2012, 18 pages.
Advisory Action for U.S. Appl. No. 12/487,004 mailed on May 24, 2012, 5 pages.
Advisory Action for U.S. Appl. No. 12/029,615 mailed on Oct. 16, 2012, 5 pages.
Non-Final Office Action for U.S. Appl. No. 12/790,437 mailed on Jan. 30, 2013, 31 pages.
Non-Final Office Action for U.S. Appl. No. 12/790,445 mailed on Dec. 19, 2012, 30 pages.
Claessens, J., et al., "A Tangled World Web of Security Issues." First Monday vol. 7, No. 3-4, (Mar. 2002): 24 pages. Web. Jun. 25, 2013.
Final Office Action for U.S. Appl. No. 12/203,816 mailed on Jul. 5, 2013, 25 pages.
Notice of Allowance for U.S. Appl. No. 12/029,600 mailed on Jun. 11, 2013, 10 pages.
Notice of Allowance for U.S. Appl. No. 12/029,609 mailed on May 29, 2013, 14 pages.
Notice of Allowance for U.S. Appl. No. 12/212,599 mailed on Jun. 19, 2013, 6 pages.
Final Office Action for U.S. Appl. No. 12/790,437 mailed on Jul. 12, 2013, 12 pages.
Final Office Action for U.S. Appl. No. 12/790,445 mailed on Jul. 5, 2013, 10 pages.
U.S. Appl. No. 12/138,997, Notice of Allowance mailed on Nov. 27, 2013, 13 pages.
Cetin, et al., "A Mashup-Based Strategy for Migration to Service-Oriented Computing", IEEE International Conference on Pervasive Services, IEEE, Jul. 20, 2007.
Li, M. et al., "Sgrid: A Service-Oriented Model for the Semantic Grid", Future Generation Computer Systems, 2004, vol. 20(1), pp. 7-18.
Sneed, Harry M. "Integrating Legacy Software Into a Service Oriented Architecture", Software Maintenance and Reengineering, CSMR 2006, IEEE.
Advisory Action for U.S. Appl. No. 12/203,816 mailed on Aug. 15, 2013, 3 pages.
Final Office Action for U.S. Appl. No. 12/029,605 mailed on Sep. 6, 2013, 19 pages.
Notice of Allowance for U.S. Appl. No. 12/212,599 mailed on Oct. 2, 2013, 3 pages.
Non-Final Office Action for U.S. Appl. No. 12/487,004 mailed on Sep. 24, 2013, 22 pages.

* cited by examiner

SANDBOX SUPPORT FOR METADATA IN RUNNING APPLICATIONS

BACKGROUND OF THE INVENTION

Embodiments of the present invention relate to computer software, and more particularly relate to techniques for facilitating the testing of changes to the metadata of a metadata-driven software application.

In recent years, an increasing number of software applications are being built using a metadata-driven approach. These applications (referred to herein as metadata-driven applications) are structured such that aspects of their content, behavior, and/or appearance are specified via metadata rather than program code.

In the course of developing and/or maintaining a metadata-driven application, it is often necessary to make changes to the metadata of the application that affect the application's runtime behavior. The metadata may need to be patched, for example, to address various bugs, or to implement enhancements. These changes must typically be tested in a controlled fashion prior to incorporating them into the mainline version (i.e., most current, tested version) of the metadata used in a production environment.

According to one known approach, such testing is achieved by creating an independent staging environment based on the production environment, and applying the changes to the test version of the metadata used in the staging environment. The application running in the staging environment is then made available to one or more users for testing purposes. In this manner, users of the application running in the production environment are shielded from any potential issues/bugs introduced by the changes. Once the changes are validated in the staging environment, the changes are applied to the mainline version of the metadata used in the production environment. This typically involves bringing the production environment offline, patching the mainline version, and then bringing the production environment back online.

While the above approach is functional, it is also problematic for several reasons. First, creating and maintaining an independent staging environment is resource-intensive and cumbersome. For example, the staging environment will typically require its own application server and data repository, and will need to be configured separately from the production environment to enable user access for testing. Second, as discussed above, the production environment must generally be brought offline prior to applying any metadata changes. This process undesirably increases the downtime of the environment, resulting in operational inefficiencies and delays. Third, a single staging environment cannot support situations where multiple (possibly incompatible) sets of metadata changes need to be tested simultaneously.

BRIEF SUMMARY OF THE INVENTION

Embodiments of the present invention address the foregoing and other such problems by providing techniques for using a sandbox to test changes to the metadata of a metadata-driven application. In one set of embodiments, a mainline and a sandbox are created in a runtime environment of a metadata-driven application. The mainline is configured to include a mainline version of a metadata document of the application. The sandbox is configured to include a sandbox (i.e., test) version of the metadata document. At application runtime, requests to access and/or modify the metadata document are serviced either from the mainline or the sandbox based on a sandbox context of the current user session. Thus, changes to the metadata document may be tested on the sandbox version of the metadata document without affecting the mainline version, and vice versa. In various embodiments, multiple sandboxes may be supported in the runtime environment. In further embodiments, the sandbox version may be merged into the mainline version without bringing the runtime environment offline.

According to one set of embodiments of the present invention, a method for facilitating the testing of changes to a metadata document of a metadata-driven application is provided. The method comprises creating a mainline in a runtime environment of the metadata-driven software application, where the mainline is configured to include a mainline version of the metadata document, and creating at least one sandbox in the runtime environment of the metadata-driven software application, where the at least one sandbox is configured to include a sandbox version of the metadata document, and where the sandbox version is based on the mainline version. The method further comprises receiving, during a user session of the metadata-driven software application running within the runtime environment, a first request to access the metadata document. Either the mainline version or the sandbox version is then retrieved in response to the first request, where the retrieving is based on whether a sandbox context identifying the at least one sandbox is present in a session context of the user session.

In another set of embodiments, the method above further comprises receiving, during the user session, a request to apply one or more modifications to the metadata document, and applying the one or more modifications to either the mainline version or the sandbox version in response to the request to apply, where the applying is based on whether the sandbox context is present in the session context.

In another set of embodiments, the method above further comprises receiving, during the user session, a request to delete the metadata document, and if the sandbox context is present in the session context, marking the sandbox version as logically deleted in response to the request to delete. The mainline version is then deleted when the at least one sandbox is applied to the mainline.

In another set of embodiments, the method above further comprises applying the at least one sandbox to the mainline by merging the sandbox version into the mainline version, such that the mainline version reflects any modifications made to the sandbox version. In some embodiments, the merging is disallowed if the mainline version is determined to be more recent than the sandbox version. In further embodiments, a predetermined set of rules may be used to resolve conflicts that arise during the merging process. The predetermined set of rules may be applied automatically or manually. In yet further embodiments, the at least one sandbox may be automatically purged and deleted subsequent to being applied to the mainline. In an exemplary embodiment, the merging is performed while the runtime environment is online.

In one set of embodiments, the sandbox context may be present in session contexts of a plurality of user sessions of the metadata-driven software application, the plurality of user sessions corresponding to a plurality of distinct users of the metadata-driven software application. In this manner, the plurality of distinct users may be allowed to access the at least one sandbox.

In another set of embodiments, a plurality of operations may be performed with respect to the at least one sandbox. For example, the sandbox version may be refreshed based on the mainline version, such that the sandbox version reflects any modifications made to the mainline version. Further, a list of modifications that have been applied to the sandbox version (but have not been applied to the mainline version) may be obtained. Further, the at least one sandbox may be purged by deleting the sandbox. Further, a metadata document version in the at least one sandbox may be reset to an original version in the mainline. Yet further, the at least one sandbox may be imported from a sandbox mainline from another runtime environment, or exported as a sandbox mainline to another runtime environment.

In another set of embodiments, the mainline version and sandbox versions may be stored at relative locations in a file directory hierarchy of the runtime environment. For example, the mainline version may be stored as a first file in a first file directory of the file directory hierarchy, and the sandbox version may be stored as a second file in a second file directory located at a predetermined location relative to the first file directory in the file directory hierarchy.

According to another set of embodiments of the present invention, a method for using a plurality of sandboxes to test changes to a metadata document of a metadata-driven software application is provided. The method comprises creating the plurality of sandboxes in a runtime environment of the metadata-driven software application, where each of the plurality of sandboxes is configured to include a sandbox version of the metadata document, and where each sandbox version is based on a mainline version of the metadata document included in a mainline of the runtime environment. In response to a request received during a user session of the metadata-driven software application running within the runtime environment, either the mainline version stored in the mainline or one of the sandbox versions included in the plurality of sandboxes is retrieved, where the retrieving is based on whether a sandbox context identifying one of the plurality of sandboxes is present in a session context of the user session.

According to another set of embodiments of the present invention, a runtime environment for facilitating the testing of changes to a metadata document of a metadata-driven software application is provided. The runtime environment comprises a data repository configured to store a mainline for the metadata-driven software application, the mainline including a mainline version of the metadata document, and to store at least one sandbox for the metadata-driven software application, the at least one sandbox including a sandbox version of the metadata document, the sandbox version being based on the mainline version. The runtime environment further comprises a server communicatively coupled with the data repository, the server running a metadata engine configured to receive, during a user session of the metadata-driven software application running within the runtime environment, a request to access the metadata document, and retrieve either the mainline version or the sandbox version in response to the first request, where the retrieving is based on whether a sandbox context identifying the at least one sandbox is present in a session context of the user session.

In one set of embodiments, the data repository is a file-based repository or a database repository.

According to another set of embodiments of the present invention, a machine-readable medium for a computer system is provided, the machine-readable medium having stored thereon a series of instructions which, when executed by a processing component, cause the processing component to facilitate the testing of changes to a metadata document of a metadata-driven software application. In various embodiments, the series of instructions cause the processing component to create a mainline in a runtime environment of the metadata-driven software application, where the mainline is configured to include a mainline version of the metadata document, and create at least one sandbox in the runtime environment of the metadata-driven software application, where the at least one sandbox is configured to include a sandbox version of the metadata document, and where the sandbox version is based on the mainline version. The series of instructions further cause the processing component to receive, during a user session of the metadata-driven software application running within the runtime environment, a first request to access the metadata document. Either the mainline version or the sandbox version is then retrieved in response to the first request, where the retrieving is based on whether a sandbox context identifying the at least one sandbox is present in a session context of the user session.

A further understanding of the nature and advantages of the embodiments disclosed herein may be realized by reference to the remaining portions of the specification and the attached drawings.

BRIEF DESCRIPTION OF THE DRAWINGS

Various embodiments in accordance with the present invention will be described with reference to the drawings, in which.

DETAILED DESCRIPTION OF THE INVENTION

Figure 1:
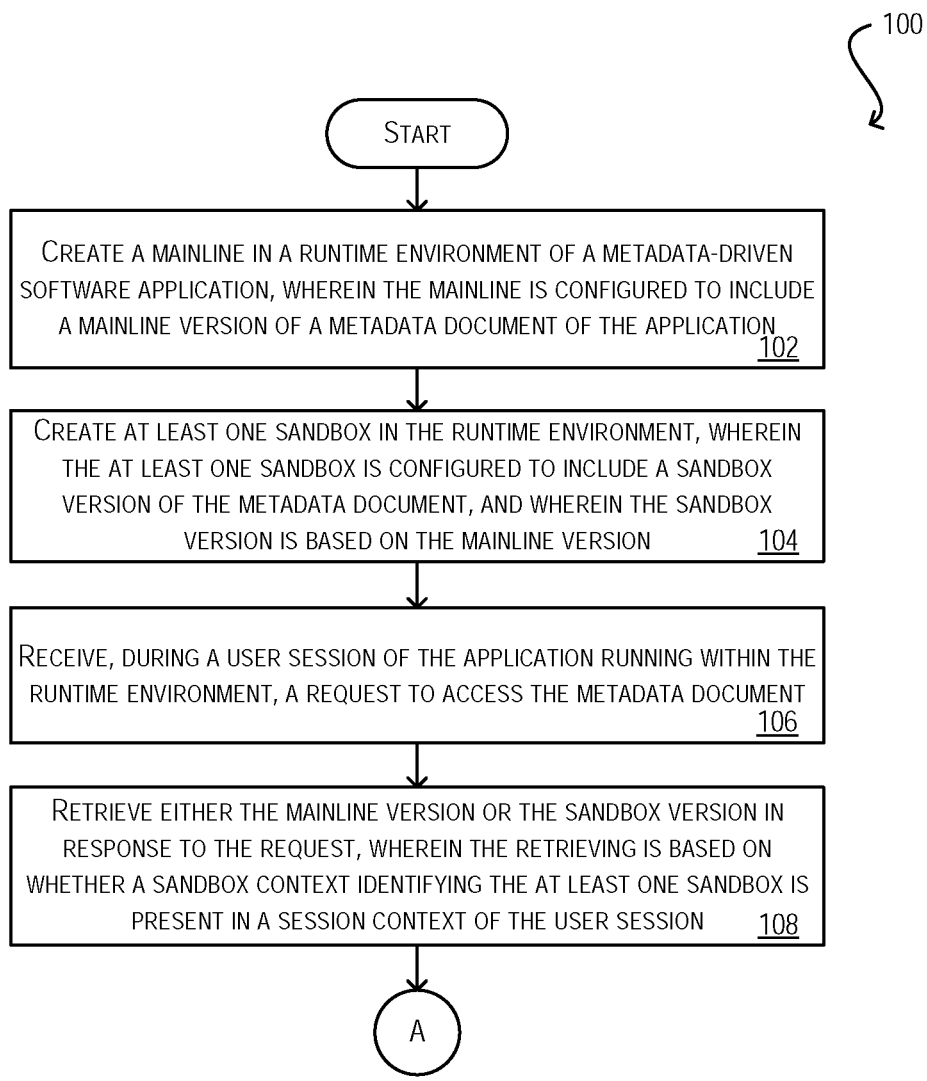
FIG. 1 is a flowchart illustrating steps performed in using a sandbox to test changes to a metadata document of a metadata-driven application in accordance with an embodiment of the present invention.

In the following description, for the purposes of explanation, numerous specific details are set forth in order to provide an understanding of the present invention. It will be apparent, however, to one skilled in the art that the present invention may be practiced without some of these specific details.

Embodiments of the present invention provide techniques for using a sandbox to test changes to the metadata of a metadata-driven application at application runtime. In one set of embodiments, a mainline and a sandbox are created in a runtime environment of a metadata-driven application. The mainline is a physical and/or logical area of the runtime environment configured to include a mainline version of a metadata document of the application. The sandbox is a physical and/or logical area of the runtime environment configured to include a sandbox (i.e., test) version of the metadata document. In various embodiments, the sandbox version is based on the mainline version.

Upon receiving a request to access the metadata document, either the mainline version or the sandbox version is retrieved, where the retrieving is based on whether a sandbox context identifying the sandbox is present in a session context of the current user session of the application. Similarly, upon receiving a request to modify the metadata document, either the mainline version or the sandbox version is modified, the modifying being based on whether the sandbox context is present in the session context. In this manner, changes to the sandbox version are isolated from the mainline version, and vice versa. Further, the sandbox version and the mainline version may be accessed on the same runtime environment (based on the sandbox context).

In various embodiments, multiple users may be configured to access the sandbox rather than the mainline. In additional embodiments, a plurality of sandboxes may be active in the runtime environment at the same time. In additional embodiments, metadata changes applied to a sandbox may be merged into the mainline in real-time, without having to bring the runtime environment offline.

Embodiments of the present invention provide several advantages over prior art techniques. For example, since the sandbox and mainline may be accessed in the same runtime environment, there is no need to set up a separate staging environment to test metadata changes. Rather, the testing may be performed directly in an existing environment (e.g., production environment). Further, since access to the sandbox or the mainline is controlled by session context, it is relatively easy to configure specific users to work against the sandbox metadata or the mainline metadata as appropriate. Further, since sandbox changes may be merged into the mainline without bringing the runtime environment offline, the system downtime traditionally required for applying metadata changes is significantly reduced or eliminated. Further, since multiple sandboxes are supported, multiple sets of changes (e.g., patches) may be tested simultaneously in a single runtime environment. Other advantages will be apparent to those of ordinary skill in the art.

Embodiments of the present invention may be used in a variety of different domains and contexts. Certain embodiments are particularly useful for testing changes to the metadata of enterprise software applications, because such changes typically require extensive testing prior to being deployed in a production environment. However, the techniques described herein may be used to facilitate the testing of metadata changes to any type of metadata-driven application.

FIG. 1 is a flowchart 100 illustrating the steps performed in using a sandbox to test changes to a metadata document of a metadata-driven application in accordance with an embodiment of the present invention. In various embodiments, the processing of flowchart 100 may be implemented in software, hardware, or combinations thereof. As software, the processing of flowchart 100 may be implemented as part of a metadata engine configured to provide metadata to one or more metadata-driven applications.

At step 102, a mainline is created in a runtime-environment of a metadata-driven application. As described above, the mainline is a physical and/or logical area of the runtime environment configured to include a mainline version of a metadata document of the application. Typically, the mainline version corresponds to the most current, tested version of the document.

In one set of embodiments, the mainline may include mainline versions of a plurality of different metadata documents. For example, the mainline may include version V1 of document "A.xml" and version V1.2 of document "B.xml." In addition, the state of the mainline may change over time as documents in the mainline are updated. Returning to the example above, version V1 of A.xml may be replaced by version V1.1. In these embodiments, each unique state of the mainline is labeled using a specific "mainline context." Thus, the state comprising version V1 of A.xml and version V1.2 of B.xml may be labeled as a first mainline context C1, and the state comprising version V1.1 of A.xml and V1.2 of B.xml may be labeled as a second mainline context C2.

At step 104, at least one sandbox is created in the runtime environment. As described above, a sandbox is a physical and/or logical area of the runtime environment configured to include a sandbox version of a metadata document of the application. Typically, the sandbox version corresponds to a test version of the document. In various embodiments, the sandbox version of the metadata document is based on a mainline version of the same document associated with a specific mainline context. In this manner, the sandbox version may be used to test one or more changes to the mainline version for that mainline context.

According to one embodiment, the sandbox version of the metadata document may be created in the sandbox at runtime of the application. For example, the sandbox version may be created dynamically when a user of the application applies one or more changes to the metadata document via a runtime user interface. According to another embodiment, the sandbox version may be created offline. For example, the sandbox version may be part of a metadata patch that is deployed to the sandbox via an offline, import process.

In various embodiments, the mainline and the sandbox represent physically and/or logically distinct storage areas within the runtime environment. This enables changes to the sandbox version to be isolated from the mainline version, and vice versa. In one embodiment, the mainline version is stored as a first file in a first namespace, and the sandbox version is stored as a second file in a second namespace located at a predetermined hierarchical location relative to the first namespace. Thus, the location of the mainline version of the metadata document may be used to easily determine the location of sandbox versions of the same document. The mainline version and sandbox version may be stored in a single data repository (e.g., a centralized metadata repository), or in separate repositories.

At step 106, a request to access the metadata document is received during a user session of the application running in the runtime environment. In response to the request, either the mainline version or the sandbox version is retrieved, wherein the retrieving is based on whether a sandbox context identifying the sandbox created in step 104 is present in a session context of the user session (step 108). If the sandbox context is present, the sandbox version is retrieved and used to service the access request. If the sandbox context is not present, the mainline version is retrieved and used to service the access request. Otherwise, the specific sandbox identified in the sandbox context is used to determine which sandbox version to retrieve. In this manner, multiple versions of the metadata document (e.g., mainline version and one or more sandbox versions) may be accessed and tested in a single runtime environment.

In some cases, the sandbox context may be present in the session context, but the sandbox version may not have been created yet in the sandbox. In these situations, the mainline version included in the mainline context associated with the sandbox will be retrieved.

According to one set of embodiments, the sandbox version of the metadata document may be exposed to a plurality of users of the application in the runtime environment. This may be achieved by simply setting the sandbox context in the runtime sessions for those users. This avoids the need to make extensive changes to configuration and/or security settings to enable testing.

Figure 2:
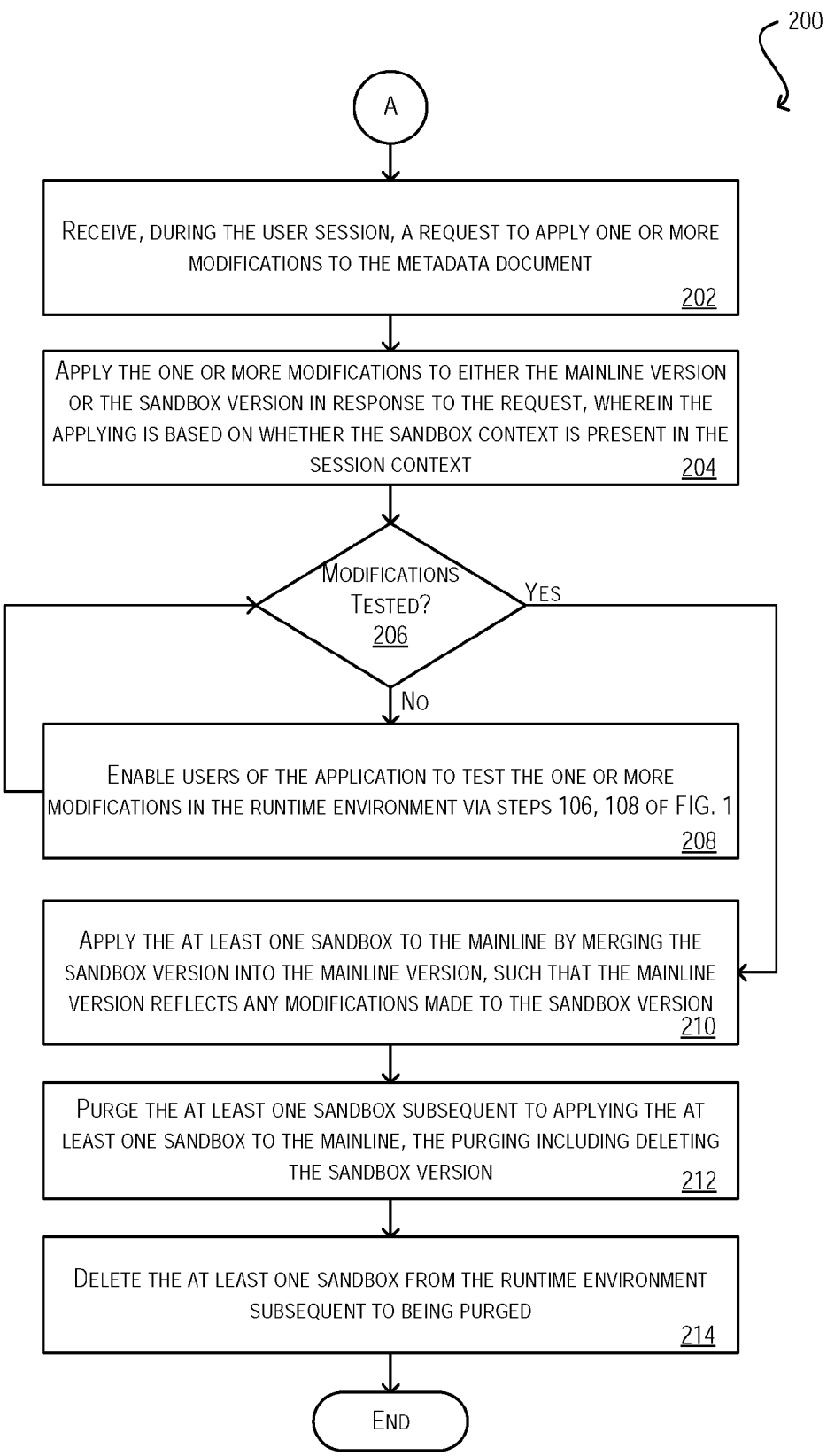
FIG. 2 is a flowchart illustrating further steps performed in using a sandbox to test changes to a metadata document of a metadata-driven application in accordance with an embodiment of the present invention.

FIG. 2 is a flowchart 200 illustrating further steps that may be performed in using the sandbox created in step 104 of FIG. 1 to test changes to a metadata document in accordance with an embodiment of the present invention. At step 202, a request to apply one or more modifications to the metadata document is received during a user session of the application. In response to the request, the one or more modifications are applied either to the mainline version or the sandbox version, wherein the applying is based on whether the sandbox context is present in the session context of the user session (step 204). If the sandbox context is present, the one or more modifications are applied to the sandbox version. If the sandbox context is not present, the one or more modifications are applied to the mainline version. The specific sandbox identified in the sandbox context is used to determine which sandbox version will be modified.

The one or more modifications may include, for example, the deletion of an element in the metadata document, the creation of a new element in the metadata document, and the update of an element in the metadata document. In some cases, the entire metadata document may be marked for deletion. If this occurs when the sandbox context is present, the sandbox version of the document will be logically (but not physically) deleted from the sandbox. The process of deleting a metadata document is described in greater detail below.

At steps 206, 208, the one or more modifications are typically tested by users of the metadata-driven software application within the runtime environment. Once the modifications are tested, the sandbox created at step 104 of FIG. 1 is applied to the mainline by merging the sandbox version into the mainline version, such that the mainline version reflects any modifications made to the sandbox version (step 210). As indicated above, this operation is typically performed after the changes in the sandbox have been validated and are ready to be exposed to all of the users of the application. In one set of embodiments, the merging is disallowed if the current mainline version is more recent than the mainline version upon which the sandbox version is based. This may occur, for instance, if the mainline version is updated subsequent to creating the sandbox version in the sandbox. By way of example, assume version V1 of A.xml is resident in the mainline, and version S1-V1 of A.xml is created in sandbox S1 based on V1. Further, assume that V1 is subsequently updated to V2 in the mainline, and S1-V1 is subsequently updated to S1-V2 in sandbox S1. Since V2 of A.xml in the mainline now contains changes that are not in S1-V2 (or S1-V1) in sandbox S1, V2-S1 cannot be merged back into the mainline without losing the changes made to V2. Accordingly, the merging is prohibited in this scenario.

In some situations, a conflict may arise when the sandbox is applied to the mainline. In these cases, one or more predetermined rules may be used to resolve the conflict and enable the merging process to complete. These predetermined rules may be applied automatically or manually (e.g., by a system administrator).

Significantly, the step of applying of the sandbox changes to the mainline does not require the runtime environment to be brought offline. In other words, the merging process occurs transparently while the application is still running. Users working against the mainline version of the metadata at that time will simply begin seeing the sandbox changes once the merge is complete. Accordingly, the downtime traditionally required for applying metadata changes to an environment are minimized or avoided.

In one set of embodiments, the sandbox is automatically purged subsequent to being applied to the mainline. This purging includes deleting the sandbox version (and all other sandbox metadata) from the sandbox (step 212). The sandbox may also be automatically deleted from the runtime environment subsequent to being purged (step 214). This feature is particularly useful if the sandbox is used for temporary purposes. For example, the sandbox may be initially created to store metadata changes for a particular transaction of the application (e.g., changing the layout of a specific page in a page editor). Once the transaction is complete (e.g., the layout changes are committed and the changes are applied to the mainline), the sandbox is no longer necessary and may be deleted.

Although not shown in FIG. 1 or 2, several additional operations may be performed on the sandbox created in step 104. For example, the sandbox may be refreshed from the mainline, such that the sandbox version is updated to reflect any modifications to the mainline version. This enables the sandbox version to remain up-to-date when changes are made to the mainline. Further, the sandbox may be queried to determine all of the sandbox versions in the sandbox, and to determine the changes that have been applied to each sandbox version. Yet further, the sandbox may be manually purged to remove one or more sandbox versions in the sandbox.

It should be noted that the concept of purging a sandbox version of a metadata document from a sandbox is different from deleting the metadata document while the sandbox context is set. In the former case, the changes made to the sandbox version of the document are lost, but the document itself is not deleted from the application. In the latter case, the document itself is deleted. Specifically, when a request to delete the metadata document is received (while the sandbox context is set), the sandbox version is marked as logically deleted. When the sandbox is subsequently applied to the mainline, the mainline version is deleted from the mainline.

In one set of embodiments, the sandbox of step 104 may be exported as a sandbox or as a mainline to another runtime environment. In another set of embodiments, the sandbox of step 104 may be created as a result of importing a sandbox or a mainline from another runtime environment.

It should be appreciated that the specific steps illustrated in FIGS. 1 and 2 provide a particular method for using a sandbox to test changes to a metadata document of a metadata-driven application according to an embodiment of the present invention. Other sequences of steps may also be performed according to alternative embodiments. For example, the individual steps illustrated in FIGS. 1 and 2 may include multiple sub-steps that may be performed in various sequences as appropriate to the individual step. Further, additional steps may be added or removed depending on the particular applications. One of ordinary skill in the art would recognize many variations, modifications, and alternatives.

Figure 3:
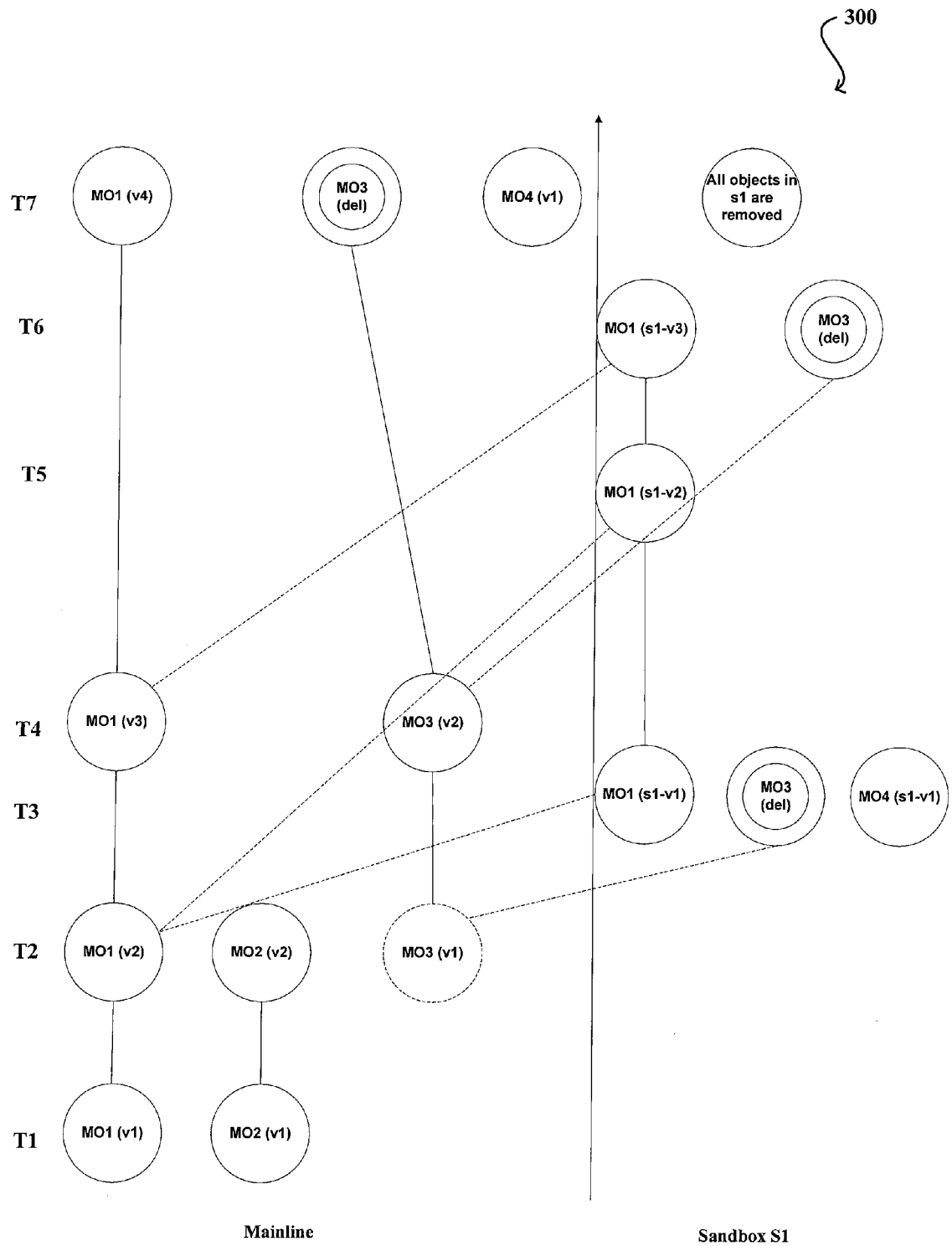
FIG. 3 is a state diagram illustrating an exemplary sequence of states for a mainline and a sandbox in accordance with an embodiment of the present invention.

FIG. 3 is a state diagram 300 illustrating an exemplary sequence of states for a mainline and a sandbox in accordance with an embodiment of the present invention. In one set embodiments, the mainline depicted in diagram 300 corresponds to the mainline created in step 102 of FIG. 1, and the sandbox S1 depicted in diagram 300 corresponds to the sandbox created in step 104 of FIG. 1.

At time T1, the mainline is created with metadata objects (i.e., documents) MO1 and MO2. As shown, MO1 is at version V1 and MO2 is at version V1. Metadata objects MO1 and MO2 are each updated to version V2 at time T2. In addition, a new metadata MO3 (V1) is created. Although not shown, sandbox S1 is also created at a time T2. In one embodiment, no metadata objects/documents are copied to a sandbox at the time when it is created.

At time T3, a sandbox version S1-V1 of MO1 (based on V2 of MO1) and a sandbox version of MO3 (based on V1 of MO3) is created in sandbox S1. MO3 is logically deleted in sandbox S1, and is therefore marked as DEL. In addition, a new metadata object MO4 (S1-V1) is created in the sandbox.

At time T4, the mainline versions of metadata objects MO1 and MO3 are updated in the mainline. Specifically, MO1 is updated to V3, and MO3 is updated to V2. Since these changes occur the mainline, the corresponding sandbox versions of these metadata objects remain unaffected.

Subsequently, the sandbox version of metadata object MO1 is updated in sandbox S1 to version S1-V2 (time T5). Since this change occurs in the sandbox, the corresponding mainline version of MO1 remains unaffected.

At time T6, sandbox S1 is refreshed to the version context of the mainline at T4. Thus, the sandbox version of MO1 is updated to a new version S1-V3 that reflects the changes made to V3 of MO1 in the mainline, and the sandbox version of MO3 is updated to a new version that reflects the changes made to V2 of MO3 in the mainline. Since MO3 is still marked as logically deleted, it is not assigned a new version number. MO4 does not exist in the mainline and is thus unaffected by the refresh operation.

At time T7, all of the metadata objects in sandbox S1 are applied to the mainline. As a result, MO1 is updated to a new version V4 that incorporates the changes in sandbox version S1-V3. Further, MO3 is deleted (as per the deletion of MO3 in the sandbox). Yet further, new metadata object MO4 is created in the mainline based on sandbox version S1-V1 of MO4.

Figure 4:
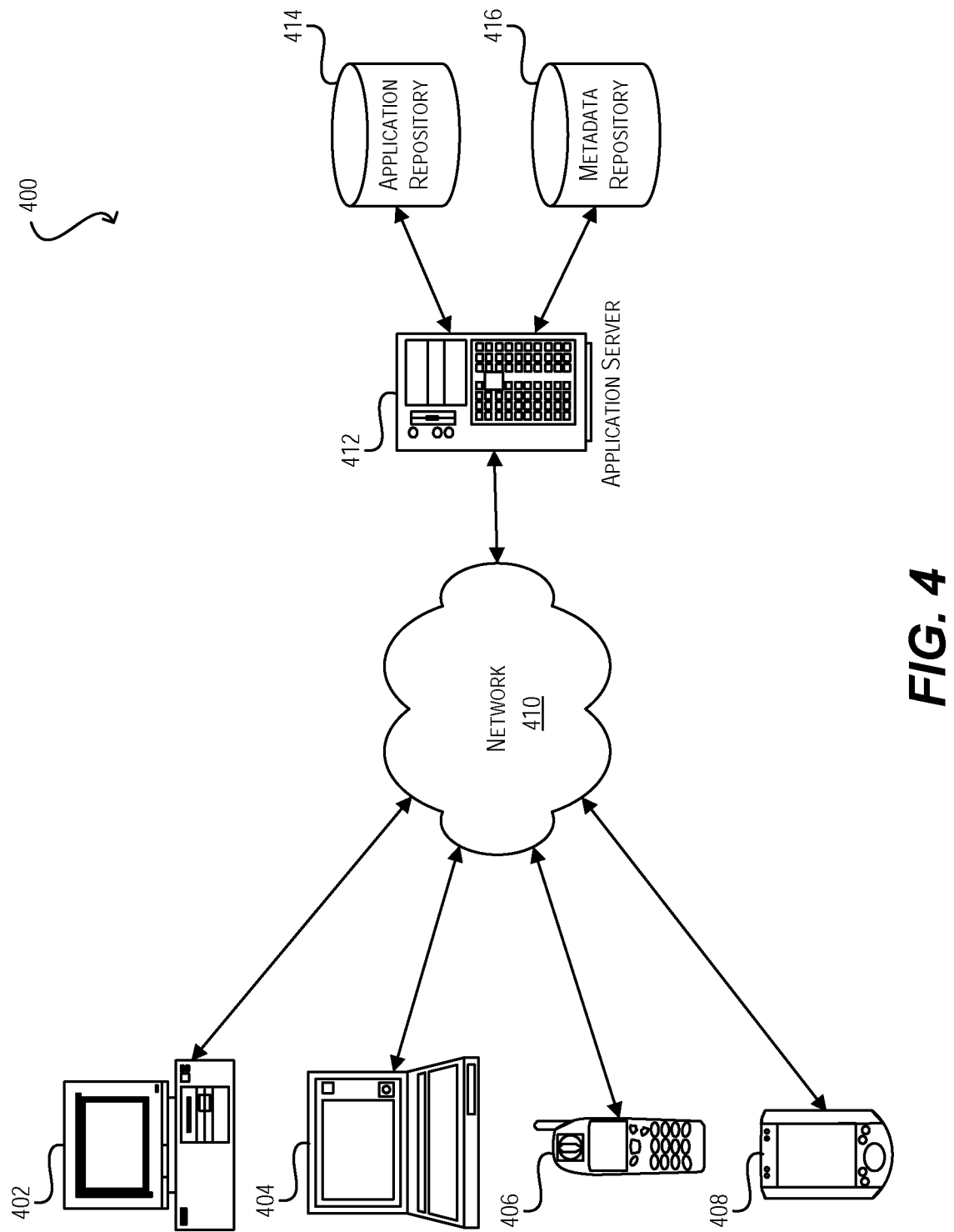
FIG. 4 is a simplified block diagram illustrating a runtime environment that may be used in accordance with an embodiment of the present invention.

FIG. 4 is a simplified block diagram illustrating components of an exemplary runtime environment 400 that may be used in accordance with an embodiment of the present invention. As shown, runtime environment 400 includes one or more client computing devices 402, 404, 406, 408, which are configured to operate a client application such as a web browser, proprietary client (e.g., Oracle Forms), or the like. In various embodiments, client computing devices 402, 404, 406, 408 may be used to interact with a metadata-driven software application, such as the metadata-driven application described with respect to FIGS. 1 and 2.

Client computing devices 402, 404, 406, 408 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 402, 404, 406, 408 may be any other electronic device, such as a thin-client computer, Internet-enabled gaming system, and/or personal messaging device, capable of communicating over a network (e.g., network 410 described below). Although exemplary runtime environment 400 is shown with four client computing devices, any number of client computing devices may be supported.

In most embodiments, runtime environment 400 includes a network 410. Network 410 may be any type of network familiar to those skilled in the art that can support data communications using any of a variety of commercially-available protocols, including without limitation TCP/IP, SNA, IPX, AppleTalk, and the like. Merely by way of example, network 410 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

Runtime environment 400 also includes one or more server computers 412 which may be general purpose computers, specialized server computers (including, by way of example, PC servers, UNIX servers, mid-range servers, mainframe computers, rack-mounted servers, etc.), server farms, server clusters, or any other appropriate arrangement and/or combination. In various embodiments, server 412 may be adapted to run one or more services or software applications described in the foregoing disclosure. For example, server 412 may correspond to an application server configured to run a metadata-driven application as described with respect to FIGS. 1 and 2. Further, server 412 may be configured to execute a metadata engine configured to perform the processing of flowcharts 100 and 200 of FIGS. 1 and 2. In alternative embodiments, the metadata engine may be run on a server computer separate from server 412.

Server 412 may run an operating system including any of those discussed above, as well as any commercially available server operating system. Server 412 may also run any of a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

Runtime environment 400 may also include one or more data repositories 414, 416. For instance, data repositories 414, 416 may include an application repository 414 configured to store transactional data for applications hosted on server 412, and a metadata repository 416 configured to store application metadata such as the mainline for an application and one or more sandboxes as described in the foregoing disclosure. Data repositories 414, 416 may reside in a variety of locations. By way of example, one or more of data repositories 414, 416 may reside on a storage medium local to (and/or resident in) server 412. Alternatively, data repositories 414, 416 may be remote from server 412, and in communication with server 412 via a network-based or dedicated connection. In one set of embodiments, data repositories 414, 416 may reside in a storage-area network (SAN) familiar to those skilled in the art. Similarly, any necessary files for performing the functions attributed to server 412 may be stored locally on server 412 and/or remotely, as appropriate. In one set of embodiments, data repositories 414, 416 may include file-based repositories. In another set of embodiments, data repositories 414, 416 may include relational databases, such as Oracle 10g, that are adapted to store, update, and retrieve data in response to SQL-formatted commands.

Figure 5:
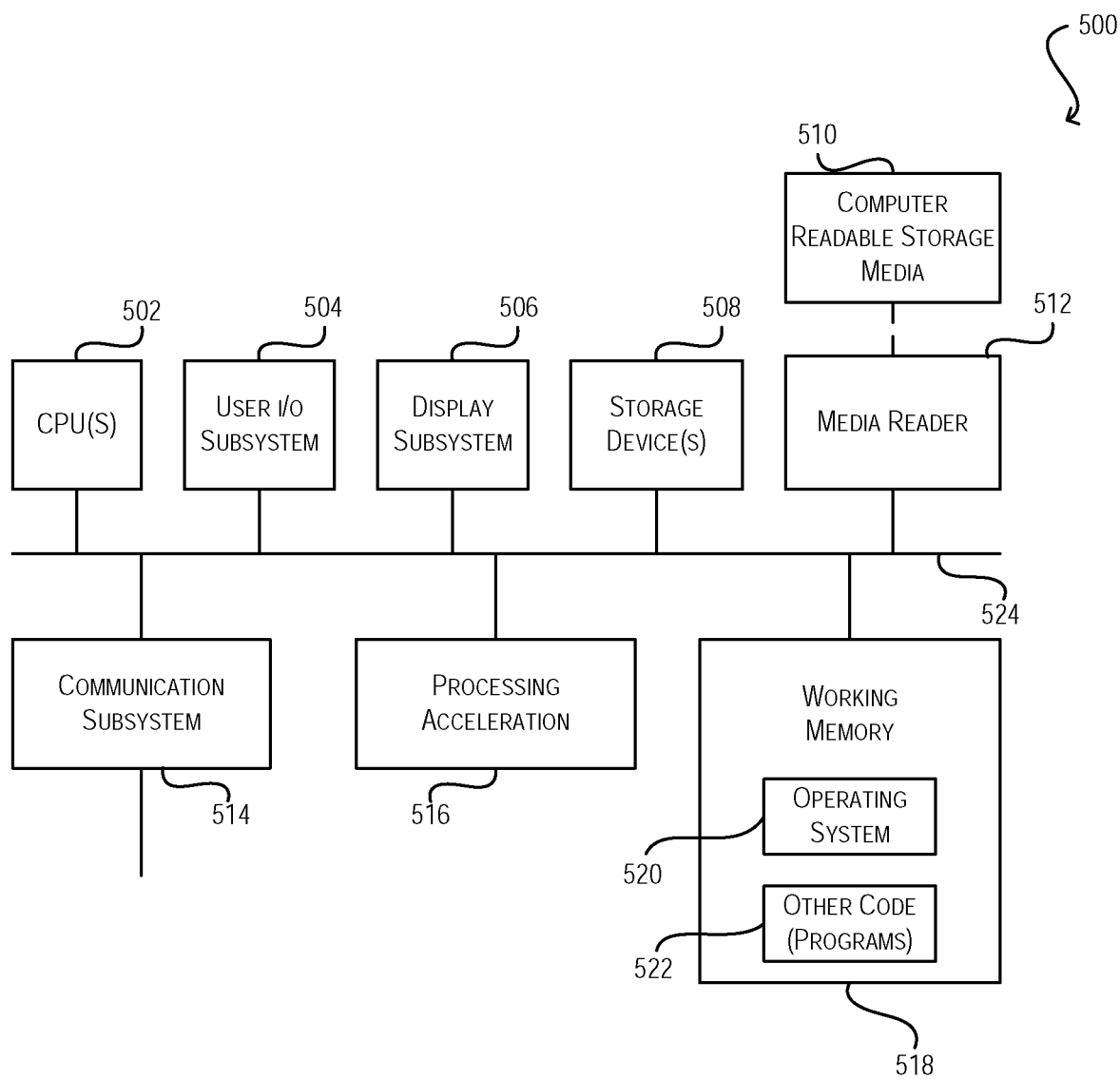
FIG. 5 is a simplified block diagram illustrating a computer system that may be used in accordance with an embodiment of the present invention.

FIG. 5 illustrates an exemplary computer system 500 that may be used in accordance with embodiments of the present invention. In various embodiments, system 500 may be used to implement any of the computers 402, 404, 406, 408, 412 described above. Computer system 500 is shown comprising hardware elements that may be electrically coupled via a bus 524. The hardware elements may include one or more central processing units (CPUs) 502, one or more input devices 504 (e.g., a mouse, a keyboard, etc.), and one or more output devices 506 (e.g., a display device, a printer, etc.). Computer system 500 may also include one or more storage devices 508. By way of example, the storage device(s) 508 may include devices such as disk drives, optical storage devices, and solid-state storage devices such as a random access memory (RAM) and/or a read-only memory (ROM), which can be programmable, flash-updateable and/or the like.

Computer system 500 may additionally include a computer-readable storage media reader 512, a communications subsystem 514 (e.g., a modem, a network card (wireless or wired), an infra-red communication device, etc.), and working memory 518, which may include RAM and ROM devices as described above. In some embodiments, computer system 500 may also include a processing acceleration unit 516, which can include a digital signal processor (DSP), a special-purpose processor, and/or the like.

Computer-readable storage media reader 512 can further be connected to a computer-readable storage medium 510, together (and, optionally, in combination with storage device(s) 508) comprehensively representing remote, local, fixed, and/or removable storage devices plus storage media for temporarily and/or more permanently containing computer-readable information. Communications system 514 may permit data to be exchanged with network 510 and/or any other computer described above with respect to runtime environment 400.

Computer system 500 may also comprise software elements, shown as being currently located within working memory 518, including an operating system 520 and/or other code 522, such as an application program (which may be a client application, Web browser, mid-tier application, RDBMS, etc.). In an exemplary embodiment, working memory 518 may include executable code and associated data structures (such as caches) for executing the processing of flowcharts 100 and 200 of FIGS. 1 and 2. It should be appreciated that alternative embodiments of computer system 500 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by a computer.

While the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for facilitating the testing of changes to a metadata document of a metadata-driven software application, the method comprising:
   creating a mainline version of the metadata document in a runtime environment of the metadata-driven software application, wherein content of the metadata document defines at least in part a user-facing appearance and a behavior of the metadata-driven software application;
   creating at least one sandbox in the runtime environment of the metadata-driven software application, wherein each of the at least one sandbox is configured to include a sandbox version of the metadata document, and wherein each sandbox version is based on the mainline version;
   during a user session of the metadata-driven software application running within the runtime environment, receiving from the metadata-driven software application a first request to access the metadata document; and
   retrieving either the mainline version or the sandbox version of the metadata document in response to the first request, wherein the retrieving is based on whether a sandbox context identifying the at least one sandbox is present in a session context of the user session.

2. The method of claim 1, further comprising:
   receiving, during the user session, a second request to apply one or more modifications to the metadata document; and
   applying the one or more modifications to either the mainline version or the sandbox version in response to the second request, wherein the applying is based on whether the sandbox context is present in the session context.

3. The method of claim 2, wherein the one or more modifications are selected from a group consisting of: creation of a metadata element, deletion of a metadata element, and update of a metadata element.

4. The method of claim 1, further comprising applying the at least one sandbox to the mainline by merging the sandbox version into the mainline version, such that the mainline version reflects any modifications made to the sandbox version.

5. The method of claim 4, wherein the merging is disallowed if the mainline version is determined to be more recent than the sandbox version.

6. The method of claim 4, wherein the merging is performed while the runtime environment is online.

7. The method of claim 4, wherein conflicts that arise during the merging are resolved automatically based upon one or more predefined rules.

8. The method of claim 4, further comprising automatically purging the at least one sandbox subsequent to applying the at least one sandbox to the mainline, the purging including deleting the sandbox version.

9. The method of claim 8, further comprising automatically deleting the at least one sandbox from the runtime environment subsequent to being purged.

10. The method of claim 1, further comprising refreshing the sandbox version based on the mainline version, such that the sandbox version reflects any modifications made to the mainline version.

11. The method of claim 1, further comprising obtaining a list of modifications applied to the sandbox version that have not been applied to the mainline version.

12. The method of claim 1, further comprising purging the at least one sandbox by deleting the sandbox version.

13. The method of claim 1, further comprising:
receiving, during the user session, a second request to delete the metadata document; and
if the sandbox context is present in the session context, marking the sandbox version as logically deleted in response to the second request.

14. The method of claim 13, further comprising deleting the mainline version when the at least one sandbox is applied to the mainline.

15. The method of claim 1, wherein the sandbox context may be present in session contexts of a plurality of user sessions of the metadata-driven software application, the plurality of user sessions corresponding to a plurality of distinct users of the metadata-driven software application, thereby enabling the plurality of distinct users to access the sandbox version.

16. The method of claim 1, wherein the mainline version is stored as a first file in a first file directory of a file directory hierarchy, and wherein the sandbox version is stored as a second file in a second file directory located at a predetermined location relative to the first file directory in the file directory hierarchy.

17. The method of claim 1, further comprising exporting the at least one sandbox as a new sandbox in another runtime environment.

18. The method of claim 1, further comprising exporting the at least one sandbox as a new mainline in another runtime environment.

19. The method of claim 1, wherein the at least one sandbox is created by importing an existing sandbox from another runtime environment.

20. The method of claim 1, wherein the at least one sandbox is created by importing an existing mainline from another runtime environment.

21. The method of claim 1, wherein the at least one sandbox comprises a plurality of sandboxes.

22. A system comprising:
a processor configured to execute a metadata-driven software application in a runtime environment;
a memory storing a metadata document containing content that defines at least in part a user-facing appearance or a behavior of the metadata-driven software application;
a data repository configured to store a mainline version of the metadata document for the metadata-driven software application and at least one sandbox for the metadata-driven software application, the at least one sandbox including a sandbox version of the metadata document, the sandbox version being based on the mainline version; and
a server communicatively coupled with the data repository, the server running a metadata engine configured to:
receive, during a user session of the metadata-driven software application running within the system, a request from the metadata-driven software application to access the metadata document; and
retrieve either the mainline version or the sandbox version in response to the first request, wherein the retrieving is based on whether a sandbox context identifying the at least one sandbox is present in a session context of the user session.

23. The system of claim 22, wherein the data repository is a file-based repository or a database repository.

24. The system of claim 22, further comprising a list for each sandbox version, the list comprising modifications applied to said each sandbox that have not yet been applied to the mainline version.

25. The system of claim 22, further comprising a set of predefined rules, the predefined rules automatically applied to resolve conflicts that arise while merging a sandbox version of the metadata document with the mainline version.

26. A non-transitory computer-readable medium for a computer system, the non-transitory computer-readable medium having stored thereon a series of instructions which, when executed by a processing component, cause the processing component to facilitate the testing of changes to a metadata document of a metadata-driven software application by:
creating a mainline version of the metadata document in a runtime environment of the metadata-driven software application, wherein content of the metadata document defines at least in part a user-facing appearance and a behavior of the metadata-driven software application;
creating at least one sandbox in the runtime environment of the metadata-driven software application, wherein the at least one sandbox is configured to include a sandbox version of the metadata document, and wherein the sandbox version is based on the mainline version;
during a user session of the metadata-driven software application running within the runtime environment, receiving from the metadata-driven software application a first request to access the metadata document; and
retrieving either the mainline version or the sandbox version of the metadata document in response to the first request, wherein the retrieving is based on whether a sandbox context identifying the at least one sandbox is present in a session context of the user session.

27. The non-transitory computer-readable medium for a computer system of claim 26, the series of instructions further comprising instructions, which when executed by the processing component, cause the processing component to facilitate the testing of changes to a metadata document of a metadata-driven software application by:
receiving, during the user session, a second request to apply one or more modifications to the metadata document; and
applying the one or more modifications to either the mainline version or the sandbox version in response to the second request, wherein the applying is based on whether the sandbox context is present in the session context.

28. The non-transitory computer-readable medium for a computer system of claim 27, wherein the one or more modifications are selected from a group consisting of: creation of a metadata element, deletion of a metadata element, and update of a metadata element.

29. The non-transitory computer-readable medium for a computer system of claim 26, the series of instructions further comprising instructions, which when executed by the processing component, cause the processing component to facilitate the testing of changes to a metadata document of a metadata-driven software application by:
applying the at least one sandbox to the mainline by merging the sandbox version into the mainline version, such that the mainline version reflects any modifications made to the sandbox version;
wherein the merging is disallowed if the mainline version is determined to be more recent than the sandbox version.

30. The non-transitory computer-readable medium for a computer system of claim 29, wherein the merging is performed while the runtime environment is online.

31. The non-transitory computer-readable medium for a computer system of claim 29, wherein the merging is performed while the runtime environment is online.

32. The non-transitory computer-readable medium for a computer system of claim 26, the series of instructions further comprising instructions, which when executed by the processing component, cause the processing component to facilitate the testing of changes to a metadata document of a metadata-driven software application by:
- receiving, during the user session, a second request to delete the metadata document; and
- if the sandbox context is present in the session context, marking the sandbox version as logically deleted in response to the second request.

* * * * *

UNITED STATES PATENT AND TRADEMARK OFFICE
CERTIFICATE OF CORRECTION

PATENT NO. : 8,782,604 B2  Page 1 of 1
APPLICATION NO. : 12/101420
DATED : July 15, 2014
INVENTOR(S) : Konduri et al.

It is certified that error appears in the above-identified patent and that said Letters Patent is hereby corrected as shown below:

In the Specification

In column 3, line 6, delete "sandbox mainline" and insert -- sandbox/mainline --, therefor.

In column 3, line 7, delete "sandbox mainline" and insert -- sandbox/mainline --, therefor.

Signed and Sealed this
Twenty-fourth Day of February, 2015

Michelle K. Lee
*Deputy Director of the United States Patent and Trademark Office*